United States Patent
Berman

(10) Patent No.: US 9,134,519 B2
(45) Date of Patent: Sep. 15, 2015

(54) MULTI-MODE FIBER OPTICALLY COUPLING A RADIATION SOURCE MODULE TO A MULTI-FOCAL CONFOCAL MICROSCOPE

(75) Inventor: Richard Berman, King (CA)

(73) Assignee: Spectral Applied Reseach Inc., Richmond Hill, Ontario (CA)

( * ) Notice: Subject to any disclaimer, the term of this patent is extended or adjusted under 35 U.S.C. 154(b) by 0 days.

(21) Appl. No.: 13/603,231

(22) Filed: Sep. 4, 2012

(65) Prior Publication Data

US 2013/0010353 A1   Jan. 10, 2013

Related U.S. Application Data

(62) Division of application No. 12/632,757, filed on Dec. 7, 2009, now Pat. No. 8,275,226.

(60) Provisional application No. 61/120,942, filed on Dec. 9, 2008.

(51) Int. Cl.
*G02B 6/06* (2006.01)
*G02B 21/00* (2006.01)

(52) U.S. Cl.
CPC .............. *G02B 21/0032* (2013.01); *G02B 6/06* (2013.01); *G02B 21/00* (2013.01); *G02B 21/002* (2013.01); *G02B 21/0024* (2013.01); *G02B 21/0036* (2013.01)

(58) Field of Classification Search
CPC .... G02B 21/06; G02B 21/0032; G02B 21/00; G02B 21/002; G02B 21/0024; G02B 21/0036
USPC ................... 385/115–121; 359/368–390, 744
See application file for complete search history.

(56) References Cited

U.S. PATENT DOCUMENTS 5,132,526 A * 7/1992 Iwasaki ...................... 250/201.3
5,428,475 A   6/1995 Tanaami
(Continued)

FOREIGN PATENT DOCUMENTS

DE   10350243   5/2005
EP    1510851   3/2005
(Continued)

OTHER PUBLICATIONS

Saito, Kenta et al., "A Mercury Arc Lamp-Based Multi-Color Confocal Real Time Imaging System for Cellular Structure and Function", Cell Structure and Function 33: 133-141 (2008), 2008 by Japan Society for Cell Biology.
(Continued)

*Primary Examiner* — Ryan Lepisto
*Assistant Examiner* — Guy Anderson
(74) *Attorney, Agent, or Firm* — Integral Intellectual Property Inc.; Mariam Paton; Amy Scouten

(57) ABSTRACT

A multi-mode optical fiber delivers light from a radiation source to a multi-focal confocal microscope with reasonable efficiency. A core diameter of the multi-mode fiber is selected such that an etendue of light emitted from the fiber is not substantially greater than a total etendue of light passing through a plurality of pinholes in a pinhole array of the multi-focal confocal microscope. The core diameter may be selected taking into account a specific optical geometry of the multi-focal confocal microscope, including pinhole diameter and focal lengths of relevant optical elements. For coherent radiation sources, phase randomization may be included. A multi-mode fiber enables the use of a variety of radiation sources and wavelengths in a multi-focal confocal microscope, since the coupling of the radiation source to the multi-mode fiber is less sensitive to mechanical and temperature influences than coupling the radiation source to a single mode fiber.

9 Claims, 10 Drawing Sheets

(56) References Cited

U.S. PATENT DOCUMENTS

| | | | |
|---|---|---|---|
| 5,579,157 A | 11/1996 | Tanaami | |
| 5,717,519 A | 2/1998 | Sugiyama | |
| 5,847,867 A | 12/1998 | Sugiyama | |
| 5,917,971 A * | 6/1999 | Slater | 385/31 |
| 5,952,668 A | 9/1999 | Baer | |
| 6,111,635 A | 8/2000 | Iida | |
| 6,185,036 B1 | 2/2001 | Tanaami | |
| 6,188,812 B1 | 2/2001 | Kao | |
| 6,248,995 B1 | 6/2001 | Tanaami | |
| 6,300,618 B1 | 10/2001 | Tanaami | |
| 6,456,369 B1 | 9/2002 | Ohki et al. | |
| 6,486,458 B1 | 11/2002 | Schoeppe | |
| 6,603,780 B2 | 8/2003 | Miyai | |
| 6,717,723 B2 | 4/2004 | Arai | |
| 6,909,542 B2 | 6/2005 | Sasaki | |
| 6,982,824 B2 | 1/2006 | Kei | |
| 7,002,737 B1 | 2/2006 | Akiyama | |
| 7,190,514 B2 | 3/2007 | Mikuriya | |
| 7,205,519 B2 | 4/2007 | Ishida | |
| 7,211,777 B2 | 5/2007 | Ishida | |
| 7,286,225 B2 * | 10/2007 | Aikawa | 356/328 |
| 7,349,152 B2 | 3/2008 | Kei | |
| 7,366,376 B2 * | 4/2008 | Shishkov et al. | 385/35 |
| 7,400,446 B2 | 7/2008 | Mikuriya | |
| 7,418,169 B2 * | 8/2008 | Tearney et al. | 385/25 |
| 7,447,408 B2 * | 11/2008 | Bouma et al. | 385/123 |
| 7,592,582 B2 * | 9/2009 | Mikuriya et al. | 250/216 |
| 7,843,572 B2 * | 11/2010 | Tearney et al. | 356/479 |
| 2002/0044346 A1 * | 4/2002 | Nguyen et al. | 359/368 |
| 2004/0156098 A1 * | 8/2004 | Dubois et al. | 359/368 |
| 2004/0182710 A1 | 9/2004 | Tanaami | |
| 2006/0013544 A1 * | 1/2006 | Bouma et al. | 385/116 |
| 2006/0017920 A1 * | 1/2006 | Tsuchiya et al. | 356/317 |
| 2006/0050375 A1 * | 3/2006 | Mikuriya et al. | 359/385 |
| 2006/0072191 A1 * | 4/2006 | Akiyama et al. | 359/385 |
| 2006/0114459 A1 * | 6/2006 | Aikawa | 356/328 |
| 2006/0187499 A1 * | 8/2006 | Natori et al. | 358/474 |
| 2006/0209399 A1 * | 9/2006 | Mikuriya et al. | 359/388 |
| 2006/0244973 A1 * | 11/2006 | Yun et al. | 356/511 |
| 2007/0081236 A1 * | 4/2007 | Tearney et al. | 359/390 |
| 2007/0091266 A1 * | 4/2007 | Shaver | 351/212 |
| 2007/0096014 A1 * | 5/2007 | Mikuriya et al. | 250/216 |
| 2007/0216999 A1 | 9/2007 | Tanibata | |
| 2008/0037114 A1 | 2/2008 | Sheblee | |
| 2008/0049234 A1 * | 2/2008 | Seitz | 356/521 |
| 2008/0205833 A1 * | 8/2008 | Fu et al. | 385/117 |

FOREIGN PATENT DOCUMENTS

| | | |
|---|---|---|
| EP | 1538470 | 6/2005 |
| EP | 1245986 | 12/2005 |
| JP | 5060980 | 3/1993 |
| JP | 5210051 | 8/1993 |
| JP | 5332718 | 12/1993 |
| JP | 5341191 | 12/1993 |
| JP | 6235865 | 8/1994 |
| JP | 6242380 | 9/1994 |
| JP | 6308390 | 11/1994 |
| JP | 7199074 | 8/1995 |
| JP | 8271225 | 10/1996 |
| JP | 9021959 | 1/1997 |
| JP | 9061719 | 3/1997 |
| JP | 9080312 | 3/1997 |
| JP | 9166751 | 6/1997 |
| JP | 9265043 | 10/1997 |
| JP | 9297267 | 11/1997 |
| JP | 9329748 | 12/1997 |
| JP | 10026735 | 1/1998 |
| JP | 10153737 | 6/1998 |
| JP | 10161030 | 6/1998 |
| JP | 10206739 | 8/1998 |
| JP | 11006961 | 1/1999 |
| JP | 11133306 | 5/1999 |
| JP | 11183803 | 7/1999 |
| JP | 11202217 | 7/1999 |
| JP | 11305140 | 11/1999 |
| JP | 2000010010 | 1/2000 |
| JP | 2000147384 | 5/2000 |
| JP | 2000206412 | 7/2000 |
| JP | 2001051200 | 2/2001 |
| JP | 2001228402 | 8/2001 |
| JP | 2002072102 | 3/2002 |
| JP | 2002090627 | 3/2002 |
| JP | 2002221663 | 8/2002 |
| JP | 2003121746 | 4/2003 |
| JP | 2003156698 | 5/2003 |
| JP | 2003270543 | 9/2003 |
| JP | 2004093721 | 3/2004 |
| JP | 2004317704 | 11/2004 |
| JP | 2004354671 | 12/2004 |
| JP | 2005037690 | 2/2005 |
| JP | 2005070689 | 3/2005 |
| JP | 2005148454 | 6/2005 |
| JP | 2005233802 | 9/2005 |
| JP | 2005234030 | 9/2005 |
| JP | 2005338136 | 12/2005 |
| JP | 2006058321 | 3/2006 |
| JP | 2006084960 | 3/2006 |
| JP | 2006091445 | 4/2006 |
| JP | 2006276561 | 10/2006 |
| JP | 2006343606 | 12/2006 |
| JP | 2006350004 | 12/2006 |
| JP | 2006350005 | 12/2006 |
| JP | 2007101910 | 4/2007 |
| JP | 2007187945 | 7/2007 |
| JP | 2007199458 | 8/2007 |
| JP | 2007219121 | 8/2007 |
| JP | 2007248602 | 9/2007 |
| WO | 03026831 | 4/2003 |

OTHER PUBLICATIONS

Anderson, Guy, Non-Final Office Action for U.S. Appl. No. 12/632,757, Mar. 30, 2012.
Anderson, Guy, Notice of Allowance for U.S. Appl. No. 12/632,757, Jul. 20, 2012.
Anderson, Guy, Restriction Requirement for U.S. Appl. No. 12/632,757, Dec. 9, 2011.
Luck, Wulf, Extended European Search Report for EP09405217.2, Mar. 5, 2010.
Luck, Wulf, Second Exam Report for EP09405217.2, Nov. 21, 2011.
Tao, Huang, First Office Action for CN200910250726.X, Jul. 22, 2011.
Tao, Huang, Second Office Action for CN 200910250726.X, Mar. 20, 2012.
James B. Pawley, editor, Handbook of Biological Confocal Microscopy, 3rd edition (2006), Springer Science+Business Media, LLC, pp. 505-507.

* cited by examiner

MULTI-MODE FIBER OPTICALLY COUPLING A RADIATION SOURCE MODULE TO A MULTI-FOCAL CONFOCAL MICROSCOPE

CROSS-REFERENCE TO RELATED APPLICATIONS

This application is a divisional of U.S. patent application Ser. No. 12/632,757, filed Dec. 7, 2009 and issued as U.S. Pat. No. 8,275,226 on Sep. 25, 2012, which in turn claims the benefit under 35 U.S.C. §119(e) of U.S. Provisional Patent Application No. 61/120,942, filed Dec. 9, 2008, the contents of both of which are incorporated by reference herein in their entirety

TECHNICAL FIELD

This disclosure is generally related to the technical field of multi-focal confocal microscopy.

BACKGROUND

High-resolution confocal laser microscopy is an established field in modern imaging and bioimaging technologies. This technique provides sharp, high-magnification, three-dimensional imaging with submicron resolution by non-invasive optical sectioning and rejection of out-of-focus information (see, T. Corle and G. Kino, "Confocal Scanning Optical Microscopy and Related Imaging Systems", Academic Press, San Diego, 1996). A confocal optical scanner is described in U.S. Pat. No. 5,579,157 to Tanaami et al.

Traditional point scanning confocal systems project a single diffraction limited point of light onto a sample. By imaging that point onto a single element detector, the reflected or fluorescence light originating from that point in the sample can be measured. A single pinhole placed at a conjugate image plane located between the sample and the detector rejects out of focus light and creates the confocal effect. By scanning the point of light in a manner designed to illuminate the focal plane, for example, by raster scanning, an image of the sample can be constructed point by point. By moving the focal plane optically or by moving the sample, multiple focal planes can be imaged and a 3D image constructed.

The use of optical fibers as flexible laser delivery subsystems has been established for many years, proving particularly useful in confocal microscopy. For traditional point scanning confocal microscopy, the only fiber that can be used effectively is a single mode fiber. The light that is emitted from the distal end of a single mode fiber may be considered equivalent to light that is emitted from a diffraction limited source. This fiber tip is re-imaged through the pinhole and onto the sample at or near its diffraction limited size.

A single mode fiber is an optical fiber that is designed for the transmission of a single spatial mode of light as a carrier. This mode of light may contain a variety of different wavelengths, although the range of wavelengths that can be transmitted is a function of the diameter of the core of the fiber. Typical core diameters of single mode fibers are only slightly larger than the wavelengths of light that they transmit. For example, a fiber that transmits in a band around 488 nm is approximately 3.5 microns in core diameter. The cone angle of light that can be coupled into and is emitted from a single mode fiber is characterised by the numerical aperture (NA) of the fiber. The NA of a single mode fiber is a function of the difference between the refractive index of the fiber core and cladding. The distribution of light emitted from a single mode fiber is well approximated by a Gaussian shape, the width of which is determined by the NA of the fiber.

Because of the small diameter of the fiber core, single mode fibers are used most often with laser sources. Other sources of radiation are difficult or impossible to couple into single mode fibers with good efficiency.

A recent development has been the parallel application of the confocal technique. By the use of various optical means, a plurality of near diffraction limited illumination points are projected onto or into the sample. Each of these points is imaged through a corresponding pinhole at a conjugate focal plane onto an image sensor such as a CCD camera. In effect, such a system operates as a plurality of point scanning confocal systems operating in parallel. Several commercial implementations of this concept exist on the market today and can be referred to in general as multiplexed confocal systems.

One implementation of a multiplexed confocal system uses a spinning disk comprising a pattern of several thousand pinholes. An example of one such spinning disk confocal system is one which comprises a Nipkow disk. The use of a multiplexed confocal system employing the Nipkow disk method with microlenses has been disclosed in, for example, U.S. Patent Publication No. 2007/0096014 to Mikuriya et al. The microlenses create a plurality of focal points. A confocal system which creates multiple focal points using microlenses or other focusing means may be referred to as a multi-focal confocal system and forms a subset of multiplexed confocal systems.

In the instrument described in U.S. Patent Publication No. 2007/0096014, the exciting laser light is coupled to the incident end of an optical fiber by a condenser lens and is guided by the optical fiber to an inlet of a confocal scanner unit. A diverging beam of exciting light emitted from the distal end of the optical fiber is converted into a collimated beam by a collimating lens. The collimated beam falls on a disk with a microlens array that focuses excitation laser light onto a pinhole disk (Nipkow disk) mounted on the same axis in such a way that each lens focuses its light onto a corresponding pinhole. Multiple exciting light beams are converged to a sample by an objective lens. Fluorescence and/or reflected light originating from the sample passes through the objective lens again, returns through the same pinholes and is reflected by a dichroic mirror positioned between the microlens disk and the Nipkow disk. The image is then focused onto an image sensor by a relay lens.

In such an apparatus, the Nipkow disk is co-rotated with the microlens disk at a constant speed, and the converged points of light on the sample are scanned with the pinholes moved by the rotation. A plane of the Nipkow disk, a plane to be observed in the sample, and an image sensor plane are arranged to be conjugate with each other optically. Therefore, an optically sectioned image, that is a confocal image of the sample, is formed on the image sensor. Such a system as described above is made by Yokogawa Electric Corporation of Japan and given designations such as CSU-10, CSU-21, CSU-22 and CSU-X1.

Other implementations of multi-focal confocal systems using microlenses exist where the key differences are in the geometry of the microlens patterns and the scanning mechanisms for moving the microlenses and pinholes. An example of such a system is called the Infinity and is built by VisiTech International Ltd. of Sunderland, United Kingdom.

Illumination methods for multi-focal confocal systems are similar to traditional point scanning systems and utilize single mode fibers. In this case, the microlenses image the fiber tip to many parallel pinholes at or near the diffraction limit. The single mode fiber also creates a smooth Gaussian light distribution such that the light distribution between microlenses is relatively uniform. As with confocal point scanning systems, the typical radiation source for multi-focal confocal systems is a laser or multiple lasers coupled through a single mode fiber.

Other means of coupling single mode fibers to multi-focal confocal systems have been proposed.

If only one radiation source is optically coupled to the single mode optical fiber, the radiation source must be changed in order to excite samples using light (from lasers or other radiation sources) with different wavelengths. U.S. Pat. No. 6,603,780 to Miyai illustrates, for example, how laser light is input to a single mode optical fiber by switching between radiation sources with different wavelengths to provide multi-wavelength operation of a confocal microscope. For the above-noted reason, the conventional apparatus has been problematic in that it is not possible to observe different types of fluorescence produced by other types of excitation radiation simultaneously. Another problem is that extra time is required to attach and detach a radiation source to and from the optical fiber. Yet another problem is that vibration arising when the radiation source is attached to or detached from the optical fiber causes the sample to move.

Another approach, disclosed in Japan Patent Publication No. 2003-270543, is to use a plurality of lasers varying in wavelengths coupled to a corresponding plurality of single mode fibers, each distal end of which is provided with an individual collimator coupled to a laser beam-synthesizing mechanism for synthesizing a plurality of the laser beams and making the multi-wavelength laser beam incident as the excitation light on the confocal subsystem. The major disadvantages of this system are the bulkiness and complexity of the beam-synthesizing mechanism, and the very high requirements for thermal and temporal stability of the whole single mode fiber-based light delivery system, its components and subsystems.

Another approach of the prior art, disclosed in U.S. Pat. No. 7,190,514 to Mikuriya et al., is to use a number of lasers coupled to a proportional number of single mode fibers bundled to form a multi-core optical fiber cable. Light that exits the distal end of the multi-core optical fiber cable is collimated by a lens and projected onto a disk of microlenses. The fibers in the bundle being closely spaced (125 microns) provide almost coincident points of light of different wavelengths on the pinhole disk with their misalignment much smaller than a pinhole diameter of 50 microns. As a result, fluorescence observations can be made using a plurality of types of excitation light with the conventional confocal microscope left as is, without the need for attaching and detaching a radiation source to and from the optical fiber.

There are disadvantages to using single mode fibers for some applications. Systems using single mode fibers are, in practice, restricted to radiation sources that emit light with small etendue such as lasers with good beam quality, for example, beam quality factor $M^2<1.2$. Laser sources with good beam quality can be coupled to single mode fibers with coupling efficiencies of approximately 45% to 85% although the efficiency in practice is often less. Lasers with lesser beam quality couple with even lower efficiencies. Single mode fibers can only operate as such over a limited spectral range. Above a given upper cutoff wavelength the fiber is too small to transmit light. Below a lower cutoff wavelength, the light is no longer transmitted in a single mode. The Gaussian distribution of the single mode fiber output intensity is less than ideal for systems requiring even illumination. Only the central part of the Gaussian beam is often used, such that the variation in intensity is less than some amount, for example 20%. In such systems a compromise between evenness in light distribution across an image plane and the light utilization efficiency is required because the peripheral part of the Gaussian beam is abandoned.

Another disadvantage of a system that uses single mode fibers is the requirement for high thermal, mechanical, and temporal stability of the laser-to-fiber alignment and the high manufacturing cost of such a stable system. Designing a means of providing stable laser-to-fiber coupling, and the creation of systems coupling multiple lasers to a single mode fiber, can be challenging.

A different class of multiplexed confocal scanners exists. Multiplexed confocal scanners in that class do not utilize microlenses to focus the light through the corresponding pinholes. Such systems place the Nipkow or similar pinhole disk directly in the collimated light path with no focusing of the light through the pinholes. In some of these systems the pinholes are small slits. These systems are less efficient in their utilization of light as much of the light is blocked by the opaque regions of the Nipkow or similar disk. Such systems do not typically use single mode fibers for coupling light to the microscope and more typically use an arc lamp as the radiation source.

A primary advantage of the multi-focal approach over a multiplexed system as described above is that a greater fraction of the excitation light is directed through the pinholes. This fact provides for greater efficiency but also introduces less scattered light into the optical system which can be a limiting factor in the overall system performance.

"A Mercury Arc Lamp-Based Multi-Color Confocal Real Time Imaging System for Cellular Structure and Function", *Cell Structure and Function*, vol. 3, pages 133-141, 2008) by Saito et al. describes the use of a multi-mode fiber with a 1 mm core diameter to couple an arc lamp to a Yokogawa CSU-10. The efficiency of the light coupled from the end of the multi-mode fiber through the CSU is reported to be 1%. It is not clearly defined how this measurement was made but this number represents a low efficiency of light utilization. Saito et al. do not use this fiber with a laser but only with a broadband arc lamp source. Furthermore, with the use of such a large fiber, much of the lost light is scattered from the back surface of the pinhole disk, thus leading to a higher potential for the loss of contrast.

SUMMARY

A single-mode fiber must be used to deliver light from a radiation source module to a single point scanning microscope. Conventionally, a single-mode fiber has been used to delivery light from a radiation source module to a multi-focal confocal subsystem of a multi-focal confocal microscope, because persons skilled in the art assumed that a single-mode fiber was required.

The inventor has realized that a single-mode fiber is not required. A goal of the present invention is to design a radiation delivery module to deliver light with reasonable efficiency within a multi-focal confocal microscopy system from a radiation source module to a microscope. Efficiency may be evaluated by comparing the amount of light emitted from the radiation delivery module to the amount of light that actually reaches the microscope sample. A multi-focal confocal microscope includes a plurality of pinholes, and light incident on the multi-focal confocal microscope is focused by a plurality of focusing elements that focus the incident light onto the pinholes. The light that actually reaches the microscope is therefore the total light transmitted through the plurality of pinholes, as opposed to the case of a point scanning confocal microscope where the light that reaches the microscope is only the light transmitted through a single pinhole. Consequently, a radiation delivery module comprising a fiber of larger core diameter than a single-mode fiber can be used to deliver light from a radiation source module to a multi-focal confocal microscope. The use of such a fiber will reduce the sensitivity of the coupling between the radiation delivery module and the radiation source module to mechanical and temperature influences, thereby enabling a variety of radiation sources and wavelengths to be used in a multi-focal confocal microscope.

Etendue is a measure of the potential throughput of light in an optical system. Reasonable efficiency in the delivery of light from the multi-mode fiber to the microscope sample can be achieved so long as the etendue of light emitted from the multi-mode fiber and incident on the multi-focal confocal subsystem does not substantially exceed (for example, by a factor of 1.5 or more) the etendue of light that actually passes through the plurality of pinholes. Only light with an etendue equivalent to the etendue of light passing through the plurality of pinholes can be utilized to illuminate the microscope sample. It is the etendue of light passing through the plurality of pinholes relative to the etendue of light emitted from the multi-mode fiber that determines the efficiency.

Consequently, the core diameter of a fiber can be sufficiently large so that the fiber is indeed a multi-mode fiber for the wavelengths being transmitted through the fiber, but the core diameter should not be too large to achieve reasonable efficiency.

As described herein, light emitted from a radiation source module is guided through a multi-mode fiber to a multi-focal confocal microscope. The phase of the light may be randomized using a phase randomizer. The radiation source module may comprise one or any combination of radiation sources. A non-exhaustive list of radiation sources includes lasers, solid state radiation sources, super luminescent diodes, light emitting diodes and arc lamps. In addition, the radiation source module may include an intermediate optical fiber or light guide that transmits light from the radiation source(s) to the multi-mode fiber that connects to the multi-focal confocal microscope. A core diameter of the multi-mode fiber less than 800 microns is contemplated. A core diameter of the multi-mode fiber that does not substantially exceed 300 microns is contemplated. A core diameter of the multi-mode fiber of substantially 200 microns is contemplated. The etendue of light emitted from the multi-mode fiber and incident on the multi-focal confocal subsystem does not substantially exceed the total etendue of light that actually passes through the plurality of pinholes of the multi-focal confocal subsystem.

BRIEF DESCRIPTION OF THE DRAWINGS

The technology described herein is illustrated by way of example and not limitation in the figures of the accompanying drawings, in which like reference numerals indicate corresponding, analogous or similar elements, and in which.

Figure 1:
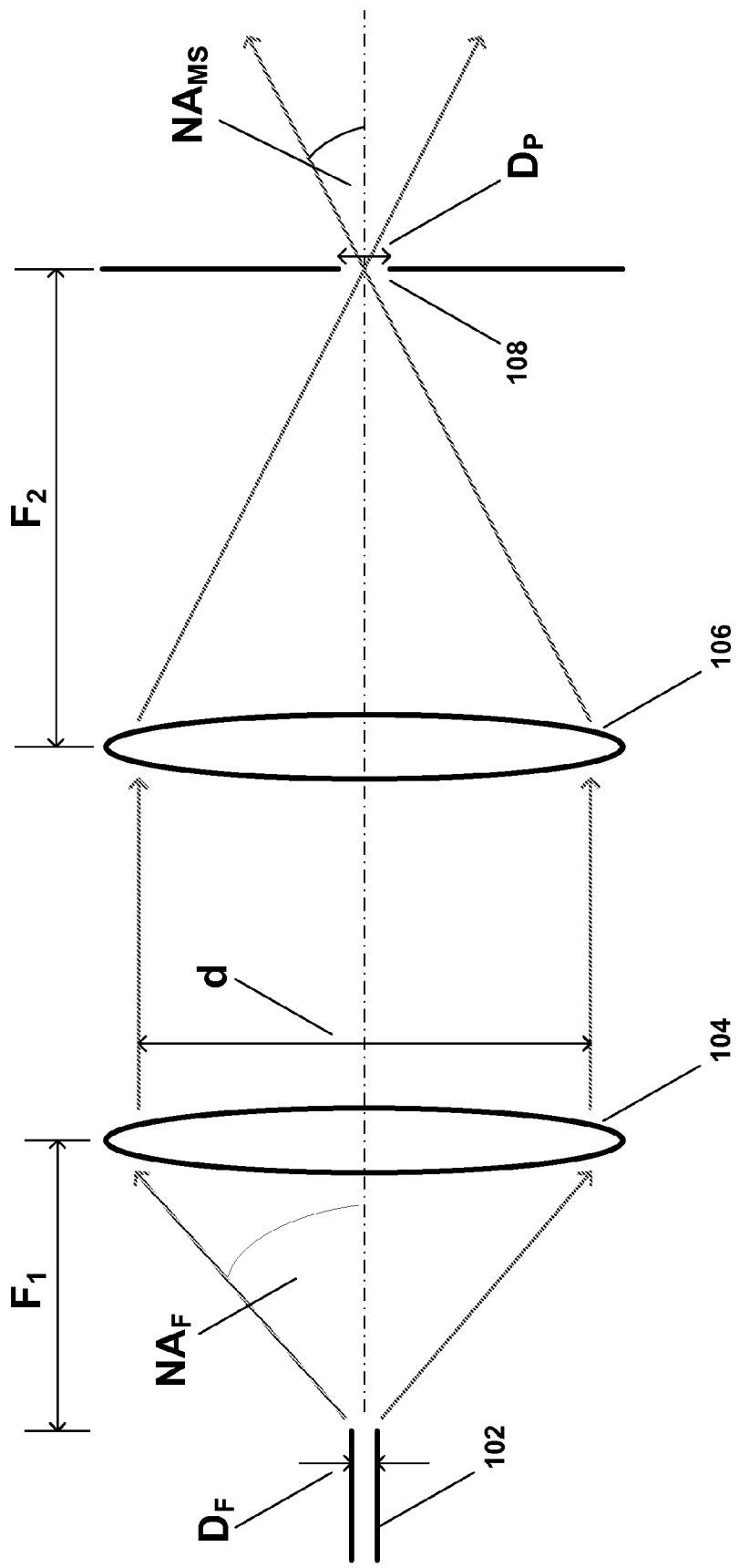
FIG. 1 is a schematic showing an example set of optics to couple an optical fiber to a single pinhole as in a point scanning confocal microscope.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

With the exception of the use of a multi-mode fiber of 1 mm core diameter to couple an arc lamp to a Yokogawa spinning disk, which was reported by Saito et al. and which is discussed in detail below, guiding exciting light from a radiation source to a confocal apparatus has been accomplished exclusively with the use of a single mode optical fiber. Single mode fiber is known by those skilled in the art to be the only type of fiber that can be used effectively for traditional point scanning confocal microscopy. There has been an assumption among those skilled in the art that all confocal microscopes, including more recently developed multi-focal confocal systems, must use single mode optical fibers. Consequently, the convention of using single mode fiber for all confocal microscopes has continued, even for more recently developed multi-focal confocal systems. Despite the high cost and numerous challenges associated with using single mode fibers, and the known complexity of coupling light from a non-laser radiation source into a single mode fiber with good efficiency, there is no evidence of any effort to use a multi-mode fiber for radiation delivery in a multi-focal confocal application with good or even reasonable efficiency, nor is there any evidence of attempts to use a multi-mode fiber with any radiation source other than an arc lamp in a multi-focal confocal microscopy system.

Saito et al. reported the use of a multi-mode fiber of 1 mm core diameter to couple an arc lamp to a multi-focal confocal microscope. Here, a multi-mode fiber is considered as an alternative to a 3 mm or 5 mm light pipe for coupling broad band light from an arc lamp to a Yokogawa spinning disk. Because the core diameter of the multi-mode fiber is large, the microlenses do not focus the light through the pinhole efficiently but instead create a large spot at each pinhole many times the pinhole diameter. Consequently, only a small fraction of light is actually transmitted through the pinholes while the majority is scattered off the pinhole disk. In the system reported by Saito et al., the light utilization efficiency is low and the scattered light is high, which means that the main advantages of the multi-focal approach are lost.

The inventor has realized that since multi-focal confocal systems use multiple focused points of light, these systems do not impose the same limitations on fiber core diameter that exist in traditional point scanning confocal systems. The inventor has therefore proposed using a multi-mode fiber to deliver radiation to a multi-focal confocal microscope.

Details of a radiation delivery system are provided whereby light is introduced into a multi-focal confocal microscope using a multi-mode fiber of core diameter and numerical aperture suitable for reasonable light utilization efficiency and image quality. Confocal observations can thus be made using a plurality of types of excitation light with a multi-mode fiber with reasonable efficiency. Examples of radiation sources include lasers, light emitting diodes, solid states radiation sources, super luminescent diodes, and arc lamps, however other radiation sources are also contemplated. Such radiation sources can be used with good efficiency on a multi-focal confocal microscope. One implementation of a multi-focal confocal microscope uses microlenses to focus light to a plurality of diffraction limited or near diffraction limited focal points. Other implementations use other types of focusing elements to focus light to a plurality of diffraction limited or near diffraction limited focal points, for example, reflective focusing elements or diffractive focusing elements.

The physical principles underlying the technology described herein are affected by having multiple focused points of light as opposed to a single point of light. A spinning disk multi-focal confocal system has multiple focused points of light at the plane of a pinhole disk. This is in contrast to a conventional point scanning confocal microscope, which may have a single point of light at the pinhole plane. A given confocal pinhole or effective pinhole, with a given near diffraction limited size, when projected backwards to the source of the radiation using geometric optics, results in a geometric size for the source that can be coupled to the system with good efficiency. Using a greater number of parallel focusing elements, such as a microlens array, necessarily reduces the effective focal length of the focusing elements and increases the geometric size of the source. If the source of the radiation is an optical fiber, the increase in source dimensions may correspond to a transition from dimensions requiring a single mode fiber to dimensions that allow the use of multi-mode fiber with good efficiency.

One aspect of the technology described herein is the delivery of light into a multi-focal confocal subsystem through the use of a radiation delivery system comprising a multi-mode fiber. A multi-mode fiber is an optical fiber that is designed to carry multiple light rays or modes concurrently over a broad spectrum of wavelengths. It can be thought of simply as a long light tube. A multi-mode fiber has a higher "light-gathering" capacity than a single mode fiber. In practical terms, the larger diameter of the fiber core simplifies the source-to-fiber coupling which enables a variety of radiation sources and wavelengths to be used.

Another aspect of the technology is the use of a phase (or spatial) randomizer to eliminate speckle effects that result when using a source of coherent radiation such as a laser with a multi-mode fiber. One implementation of the phase randomizer comprises a vibrating mechanical driver to eliminate speckle due to temporal coherence properties of the exciting laser radiation by inducing vibrations in a section of the multi-mode fiber. Alternatively or additionally, the phase randomizer may comprise a rotating diffuser placed in proximity to an incident end or distal end of the multi-mode fiber, or at a conjugate image plane of the multi-mode fiber tip. Other means of phase randomization are well known to those skilled in the art and can be used. Phase randomization may be omitted when non-coherent radiation sources, for example, light emitting diodes, are used.

The illumination system, comprising the radiation source module and radiation delivery module, is to be a high-efficiency fiber-based optical system particularly useful for multi-focal confocal microscopy. The system has a high laser-to-fiber coupling efficiency (>60% across a broad range of wavelengths) and can be used over a broad transmission range defined by the material of the optical fibers used to deliver radiation in the multi-focal confocal microscope.

A multi-mode fiber radiation delivery system will be less sensitive to mechanical and temperature influences than a single mode fiber radiation delivery system.

It should be noted that the physical principles underlying the technology described herein are affected by having multiple focused points of light as opposed to a single point of light. The light may be projected onto the sample at or near the diffraction limit which may require the pinholes to be at or near the diffraction limit. The size of the pinholes may be determined by the optics of the multi-focal confocal microscope, the wavelength of light, and the numerical aperture and magnification of the objective lens used in the multi-focal confocal microscope. Common pinhole diameters are 10 microns to 50 microns.

Figure 2:
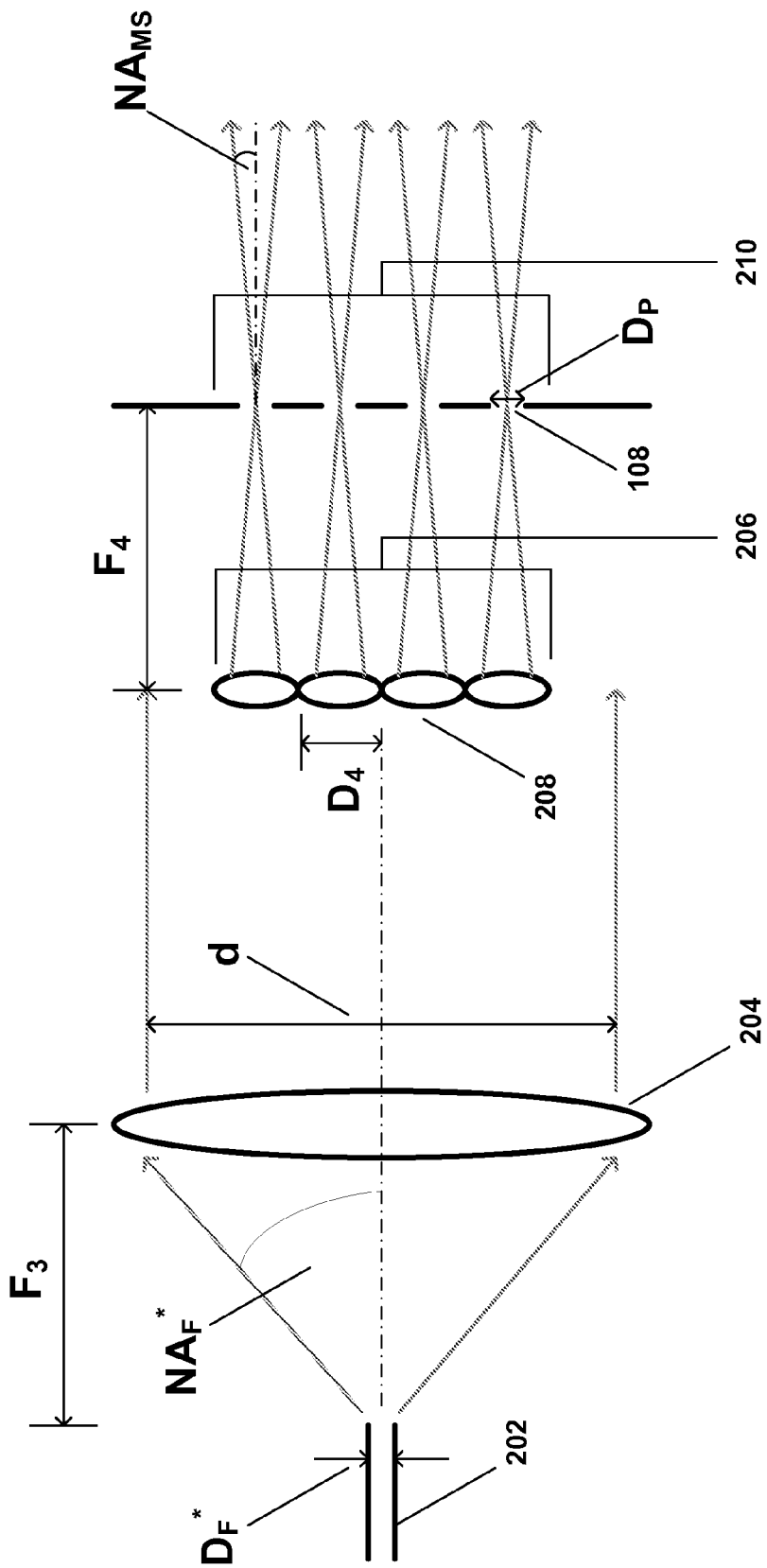
FIG. 2 is a schematic showing an example set of optics to couple an optical fiber to a plurality of pinholes as in a multi-focal confocal microscope.

With reference to FIGS. 1 and 2, which illustrate common implementations for focusing light from a source of radiation, such as an optical fiber, to a single point and multiple points respectively, the physics can be explained.

In FIG. 1 are shown the optics projecting light from a fiber 102 with a core diameter $D_F$ and numerical aperture $NA_F$ (related to the illustrated half-angle) to a single pinhole 108 of a diameter $D_P$. A lens 104 with focal length $F_1$ collimates the light emitted from the fiber 102 that is then incident on a lens 106 which has a focal length $F_2$. At the focus of the lens 106 is located the pinhole 108. The numerical aperture of the light passing through the pinhole 108, $NA_{MS}$, may match the optics of a microscope which includes an objective lens. Ideally, the lens 106 will have a numerical aperture that matches the largest numerical aperture of the microscope as measured at the image plane where the pinhole 108 is located. The numerical aperture of the lens 106 will define a diameter of a diffraction limited point of projected light at the pinhole 108.

With no loss in generality, the diameter of the diffraction limited point can be assumed to be equivalent to the diameter of the pinhole 108. If the system is examined in reverse from the pinhole 108 back towards the fiber 102, a diameter of the image of the pinhole 108 at the tip of the fiber 102, $D_{PI}$, will be equal to the diameter of the pinhole 108, $D_P$, magnified by the ratio of focal length $F_1$ to focal length $F_2$, as described in equation 1.

$$D_{PI} = \frac{F_1}{F_2} \cdot D_P \quad (1$$

Any fiber 102 with the defined $NA_F$ and a core diameter not exceeding $D_{PI}$, such that $D_F \leq D_{PI}$, will project light through the pinhole 108 unobstructed. In this case, $D_{PI}$ will be a diffraction limited diameter and therefore the light from the fiber 102 should optimally be diffraction limited and a single mode fiber is appropriate.

In FIG. 2 are shown the optics projecting light from a fiber 202 through a microlens array 206 comprising a plurality of individual microlenses 208 to a pinhole array 210 comprising a plurality of individual pinholes 108 identical to those described in FIG. 1. The fiber 202 has a core diameter $D_F^*$ and numerical aperture $NA_F^*$. Light emitted from the fiber 202 is collimated by a lens 204 with focal length $F_3$. The collimated light is then incident on the array of microlenses 206, each microlens 208 having a diameter $D_4$ and focal length $F_4$. At the focus of each microlens 208 is located an individual pinhole 108 comprised in the pinhole array 210. Again, the numerical aperture $NA_{MS}$ of the light passing through each pinhole 108 may match the optics of a microscope which includes an objective lens. Under the same assumptions as used for the single lens 106 and single pinhole 108 in FIG. 1, the pinholes 108 in the pinhole array 210 can be projected back towards the fiber 202. Similarly to equation 1, a diameter of an image of the pinhole 108 at the tip of the fiber 202 will be $D_{PI}^*$, as described in equation 2.

$$D_{PI}^* = \frac{F_3}{F_4} \cdot D_P \qquad (2$$

For typical values of $F_3$ and $F_4$, a core diameter of the fiber 202 illuminating the pinhole array 210 can therefore be much larger than a core diameter of the fiber 102 illuminating the single pinhole 108.

Any fiber 202 with the defined $NA_F^*$ and a core diameter not exceeding $D_{PI}^*$, such that $D_F^* \leq D_{PI}^*$, will project light through the pinholes 108 of the pinhole array 210 unobstructed. For example, the elements in FIG. 2 may have the following optical geometry: lens 204 having focal length $F_3$=90 mm, each microlens 208 having focal length $F_4$=15 mm, and each pinhole 108 in the pinhole array 210 having diameter $D_P$=50 microns. Under this geometry, the diameter of an image of the pinhole 108 at the tip of the fiber 202 will be $D_{PI}^*$=300 microns. Therefore, a multi-mode fiber with a core diameter $D_F^*$ not exceeding 300 microns could be used with good efficiency. It should be noted in this example that reasonable efficiency may still be achieved using a multi-mode fiber with a core diameter $D_F^*$ not substantially exceeding (for example, by a factor of 1.5 or more) 300 microns.

Alternatively, good efficiency may be achieved if the calculated diameter of a focal point at the pinholes 108 in the pinhole array 210 does not exceed the actual diameter of each pinhole 108, as described by equation 3. However, reasonable efficiency may still be achieved if the calculated diameter of the focal point at the pinholes 108 in the pinhole array 210 does not substantially exceed (for example, by a factor of 1.5 or more) the actually diameter of each pinhole 108.

$$D_F^* = \frac{F_4}{F_3} \leq D_P \qquad (3$$

The calculations above apply to a specific optical geometry. This concept can be more generally expressed in terms of the etendue $\Omega$. The etendue $\Omega_F$ of light emitted from a fiber can be defined to be the product of the solid angle subtended by the emission and the area of the fiber tip. Strictly speaking this etendue should be expressed as a double integral over the area of the fiber tip. The integrand contains the product of an infinitesimal solid angle and an infinitesimal area element. However, for the purposes here, the simpler expression suffices. A physical principle of optics says that the etendue of light will be preserved through an imaging system if measured in the same index of refraction. This calculation can be modified for a differing index of refraction by someone skilled in the art.

Likewise the maximum etendue $\Omega_P$ of light that can pass through the pinhole 108 is expressed as the product of the area of the pinhole 108 and the maximum solid angle of light passing through the pinhole 108. In the case of a point scanning confocal system, if all the light from the tip of the fiber 102 is to pass through the pinhole 108, the etendue $\Omega_F$ of light emitted from the fiber 102 must not exceed the maximum etendue $\Omega_P$ of light that can pass through the pinhole 108, or $\Omega_F \leq \Omega_P$. Therefore the maximum etendue $\Omega_F$ of light emitted from the fiber 102 that can be effectively transmitted through the pinhole 108 is $\Omega_P$.

If this condition is not satisfied then some of the light emitted from the fiber 102 will not pass through the pinhole 108 and in the case of the point scanning confocal system this light will be lost. The etendue of light that actually passes through the pinhole 108 can be designated $\Omega_F^*$ and in this case would be less than $\Omega_F$. If $\Omega_F^* \ll \Omega_F$ then much of the light is lost. Therefore, using a fiber of large core diameter for a point scanning confocal system results in an inefficient utilization of light.

The principle of etendue can be applied to the multi-focal confocal system. The maximum etendue of light that can pass through each pinhole 108 in the pinhole array 210 of FIG. 2 is the same etendue, $\Omega_P$, as for the single pinhole 108 in FIG. 1. In the multi-pinhole system, the use of the fiber 202 that can emit light with a large etendue may require that only a portion of the light emitted from the fiber 202 passes through any given pinhole 108 in the pinhole array 210. However, because there are multiple pinholes 108 in the pinhole array 210, the light that does not pass through a given pinhole 108 can pass through another pinhole 108. The total etendue $\Omega_F^*$ of light passing through the entire pinhole array 210 is the relevant quantity, which is given by $N \cdot \Omega_P$, where N is the total number of pinholes 108 that are illuminated in the pinhole array 210. If all the light from the tip of the fiber 202 is to pass through the pinholes 108 in the pinhole array 210, the etendue $\Omega_F$ of light emitted from the fiber 202 must not exceed the total etendue $\Omega_F^*$ of light that can pass through the pinholes 108 in the pinhole array 210, a condition given by equation 4.

$$\Omega_F \leq N \cdot \Omega_P \qquad (4$$

Therefore the maximum etendue $\Omega_F$ of light emitted from the fiber 202 that can be effectively transmitted through the pinhole array 210 is N times larger than in the case of a single pinhole 108. The plurality of individual pinholes 108 in the pinhole array 210 allows the etendue $\Omega_F$ of light emitted from the fiber 202 to be many times larger than in the single pinhole system of FIG. 1. Given that there are often inefficiencies in an optical design, good efficiency in practice may require the etendue $\Omega_F$ of light emitted from the fiber to be somewhat (but not substantially) larger than would be calculated in the ideal case, such that $\Omega_F > \Omega_F^*$ but not $\Omega_F \gg \Omega_F^*$. An example of an inefficiency would be the dead space between the microlenses 208 of the microlens array 206. Other additional inefficiencies will be obvious to one skilled in the art.

The method of coupling the light from the fiber 202 to the plurality of pinholes 108 in the pinhole array 210 as shown in FIG. 2 is one implementation but other means are possible as would be obvious to someone skilled in the art. The etendue principle is the most general expression explaining why a fiber emitting light of larger etendue can be used with reasonable efficiency in a multi-focal confocal system. However, the core diameter of the fiber to be used in a given optical arrangement can often be more easily calculated using alternative calculations such as used in equation 3.

Figure 3:
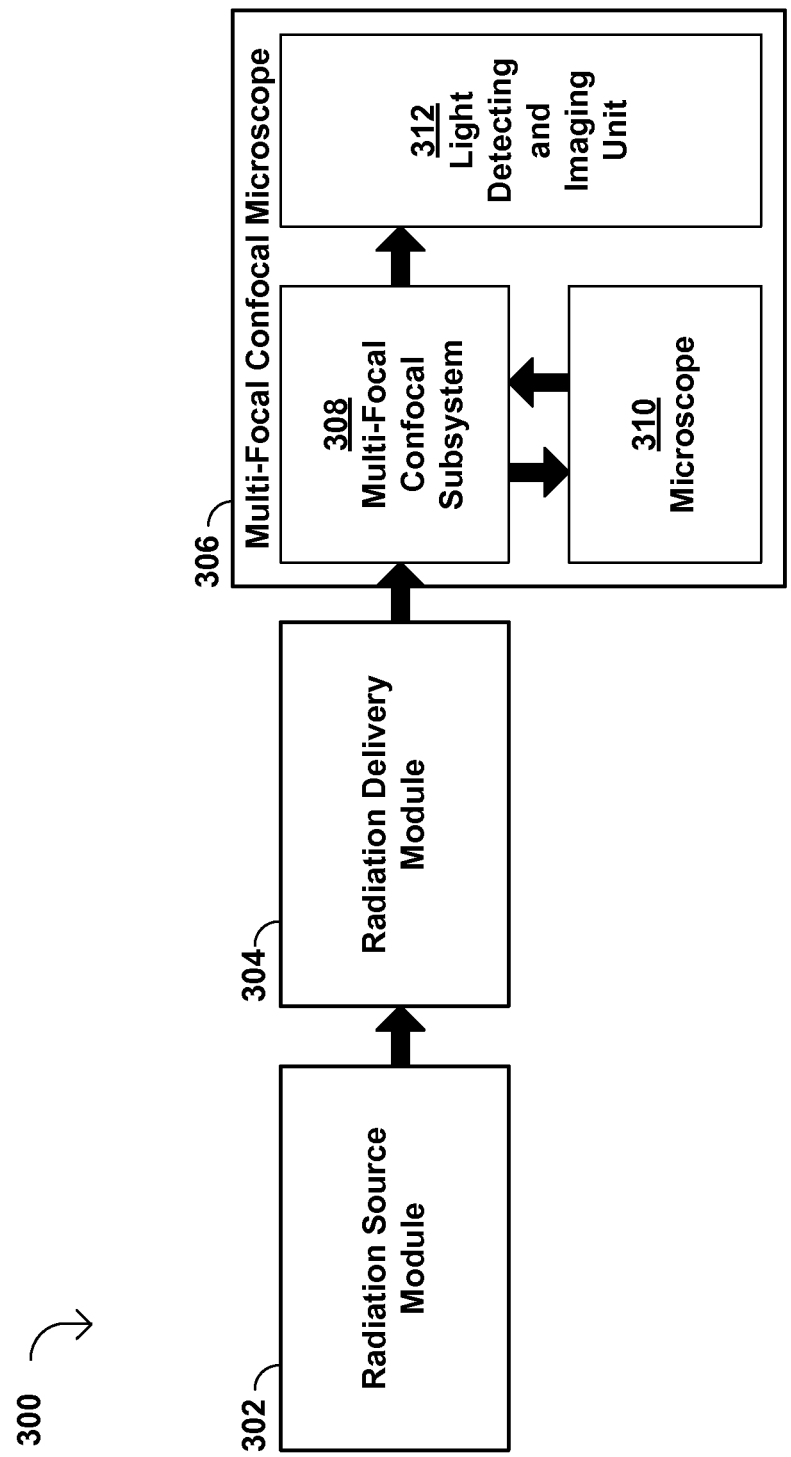
FIG. 3 is a simplified block diagram showing an example microscopy system comprising a radiation source module coupled to a multi-focal confocal microscope via a radiation delivery module.

FIG. 3 is a simplified block diagram of a multi-confocal microscopy system 300, comprising a radiation source module 302 coupled to a multi-focal confocal microscope 306 via a radiation delivery module 304.

The radiation source module 302 generates and optionally conditions radiation for acceptance into the radiation delivery module 304. The radiation source module 302 may generate multi-wavelength radiation that is suitable for illumination in confocal microscopy, particularly radiation that can be effectively reflected or scattered by a sample or can trigger fluorescence in a sample. Depending on the application, the radiation source module 302 may have several radiation sources and/or wavelengths for this purpose. One example of the radiation source module 302 is depicted in more detail by FIG. 4.

A role of the radiation delivery module 304 is to guide light from the radiation source module 302 to the multi-focal confocal microscope 306. The radiation delivery module 304 comprises at least a multi-mode fiber. Some examples of the radiation delivery module 304 are depicted in more detail by FIGS. 5-10.

The multi-focal confocal microscope 306 comprises a multi-focal confocal subsystem 308 that produces the multi-focal confocal effect; a microscope 310 that focuses radiation from the multi-focal confocal subsystem 308 onto a sample and also directs radiation from the sample back to the multi-focal confocal subsystem 308; and a light detecting and imaging unit 312 that detects and images the radiation captured by the microscope 310 via transmission from the multi-focal confocal subsystem 308. One example of the multi-focal confocal microscope 306 is depicted in more detail by FIG. 11.

Figure 4:
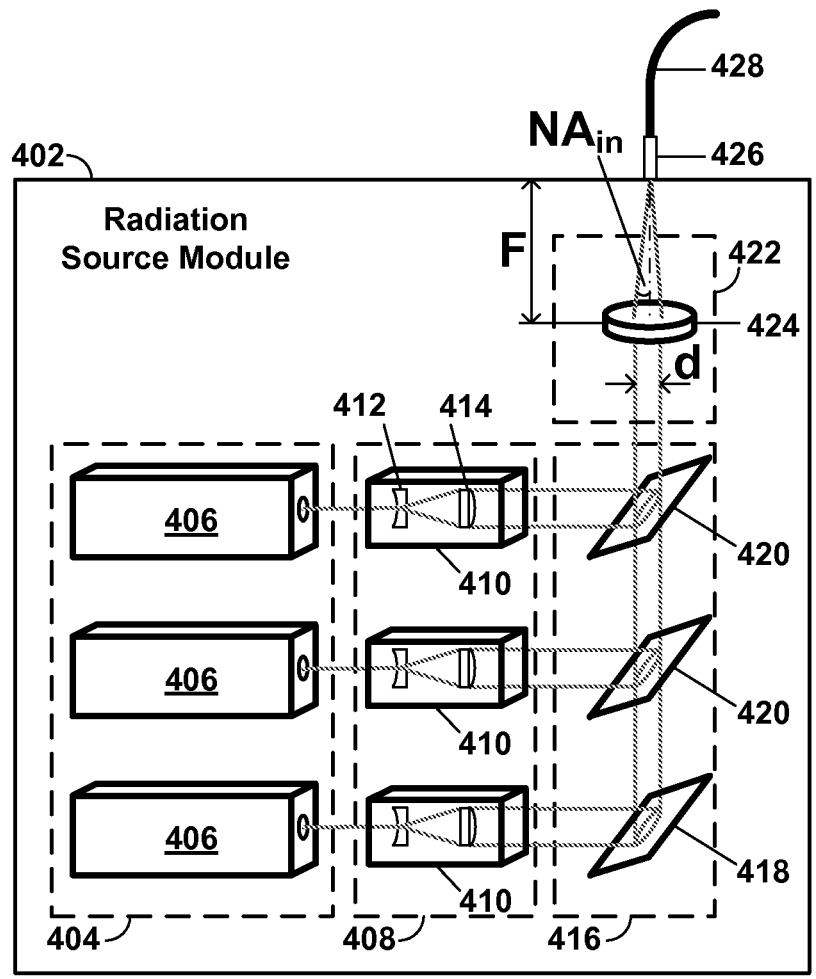
FIG. 4 is a schematic showing an example radiation source module coupled to an optical fiber, which can be used in the example microscopy system illustrated in FIG. 3.

FIG. 4 is a schematic of a radiation source module. Radiation source module 402 is an example of radiation source module 302.

Example radiation source module 402 comprises a radiation source 404 emitting light of one or more wavelengths, followed by a light control and conditioning unit 408, light combining unit 416 and light coupling unit 422.

The radiation source 404 may comprise one or more individual radiation sources 406. The radiation sources 406 are provided with one or more power supplies (not shown) and may generate radiation of different wavelengths in the UV-visible-NIR (ultraviolet-visible-near infrared) spectral range. An example implementation of a multi-focal confocal microscopy system uses lasers as the radiation sources 406 but other implementations could use any radiation sources emitting light that can be coupled to a multi-mode fiber, such as light emitting diodes (LEDs), solid state devices, super luminescent diodes (SLDs), arc lamps, or any other suitable radiation sources as would be apparent to someone skilled in the art.

Optics of the light control and conditioning unit 408 are designed to provide the radiation beam being guided into an input connector 426 of an optical fiber 428 by a condenser lens 424 with a circular cross section of a predetermined diameter. The light control and conditioning unit 408 may comprise one or more light control and conditioning subunits 410, each light control and conditioning subunit 410 corresponding to an individual radiation source 406. For the sake of simplicity, each light control and conditioning subunit 410 is shown schematically as a simple Galilean telescopic beam expander that is built from a negative lens 412 and a positive lens 414. Alternative implementations of the light control and conditioning subunits 410 may comprise anamorphic prismatic or cylindrical optics to provide an elliptical laser beam with the circular property and/or beam-shaping means to make adjustments enabling the light intensity distribution to be more uniform (such as the means disclosed in US2007096014 for converting a beam of light outgoing from a distal end of an optical fiber into a collimated beam with a predetermined intensity distribution, for example). The light control and conditioning subunits 410 may comprise additional beam shaping means to enable the light intensity distribution to be more uniform or to get a predetermined intensity profile on a plane of a microlens array disk comprised in the multi-focal confocal microscope 306. Such additional beam shaping means will be known to someone skilled in the art.

The light control and conditioning subunits 410 may optionally comprise means for control of individual radiation source power and/or wavelength to optimize micro-imaging conditions (not shown). For example, in the case that the radiation source 406 is a laser, the corresponding light control and conditioning subunit 410 may comprise an acousto-optic tunable filter (AOTF), or alternatively a mechanical shutter followed by a continuously variable neutral density filter wheel. The use of additional light control means will be known to someone skilled in the art.

The light combining unit 416 comprises optical elements that combine collimated beams of different wavelengths from the light control and conditioning unit 408 and direct them to the light coupling unit 422. The light combining unit 416 may comprise optics of any form, and may include, for example, one or more folding mirrors 418, dichroic mirrors 420, and any other suitable optical elements, as would be apparent to someone skilled in the art.

The light coupling unit 422 may comprise a lens 424 designed to focus the multi-wavelength collimated beam of a predetermined diameter onto an input face of the input connector 426 of the optical fiber 428. The lens 424 may have a short focal length F, and may be a collimator lens, a condenser lens, a micro-objective, or some other suitable lens as would be apparent to someone skilled in the art. The cross-sectional diameter d of the multicolor collimated beam and the focal length of the lens 424 may be selected or designed to obtain a specific $NA_{in}$ of the input focused beam that is proportional and close to a resulting $NA_F$* of a diverging beam, emitted from an output connector of a distal end of a multi-mode fiber (described below, in reference to FIG. 12).

Light from the radiation source module 302 is coupled to the multi-focal confocal microscope 306 via the radiation delivery module 304. FIGS. 5 to 10 show examples of the radiation delivery module 304.

In FIGS. 5 to 8, the example radiation delivery modules comprise a multi-mode fiber 504, where an input connector (not shown) is connected or connectable to an incident end of the multi-mode fiber 504 and an output connector (not shown) is connected or connectable to a distal end of the multi-mode fiber 504. The input and output connectors may be of any type, for example, FC type connectors, or any other suitable connectors as would be apparent to someone skilled in the art.

Figure 5:
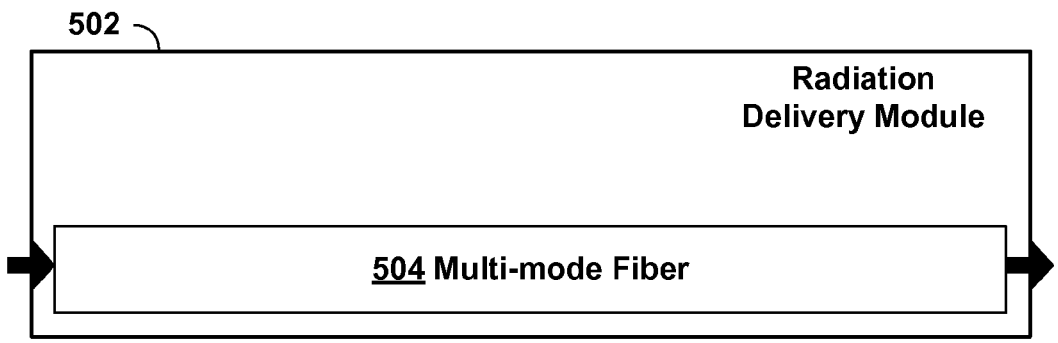
FIGS. 5-10 are simplified block diagrams showing different example radiation delivery modules, which can be used in the example microscopy system illustrated in FIG. 3.

In FIG. 5 is shown an example radiation delivery module 502 comprising the multi-mode fiber 504.

In the case that the radiation sources 406 are coherent radiation sources, such as lasers for example, a radiation delivery module may further comprise a phase randomizer. A phase randomizer is designed to suppress speckle that is present due to temporal coherence properties of coherent radiation.

Figure 6:
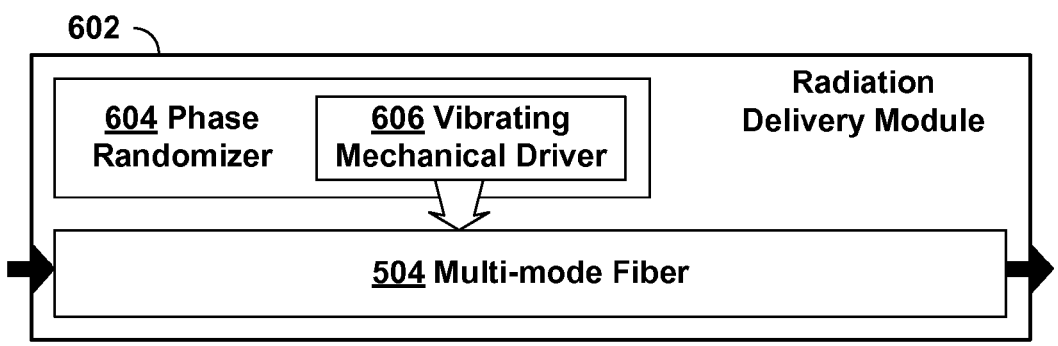

For example, an example radiation delivery module 602 in FIG. 6 comprises a phase randomizer 604 and the multi-mode fiber 504. The phase randomizer 604 comprises a vibrating mechanical driver 606 designed to generate vibrations in a section of the multi-mode fiber 504. The vibrating mechanical driver 606 is mechanically coupled to the section of the multi-mode fiber 504. For example, the vibrating mechanical driver 606 may be attached to a portion of the multi-mode fiber 504 that is coiled and loosely held by retaining clamps (not shown), allowing a long length of the multi-mode fiber 504 to be vibrated. The vibrations induced by the vibrating mechanical driver 606 may result in fast variations of the optical path lengths of individual rays in the multi-mode fiber 504, randomizing the coherence effects of the light, and as a result suppressing spatial modulation of the amplitude of image of the sample (speckle). The vibrating mechanical driver 606 may be built in accordance with Ellis et al. (*J. Cell Biol.* 83:303a, 1979) and/or may include a piezoelectric driver, or any electromechanical setup able to generate suitable vibrations as would be apparent to someone skilled in the art. For example, the vibrating mechanical driver 606 may be built in the form of an electromotor with an unbalanced weight fixed on its shaft or a linear voice coil motor.

Alternatively or additionally, a phase randomizer may comprise a rotating diffuser placed in proximity to an input connector or an output connector of a multi-mode fiber or at a conjugate image plane of the multi-mode fiber tip. The rotating diffuser may comprise a high-speed electromotor to rotate the diffuser.

To avoid high optical power losses when using a rotating diffuser, the distance $z_d$ travelled by the light from the rotating diffuser to a tip of an input connector of a multi-mode fiber or to a tip of an output connector of a multi-mode fiber may be less than $z_d$, as described in equation 5.

$$z_d < D_F^* / \theta_d \qquad (5$$

In equation 5, $D_F^*$ is the core diameter of the fiber and $\theta_d$ is a FWHM (full width at half maximum) of the angular light distribution of the rotating diffuser.

Figure 7:
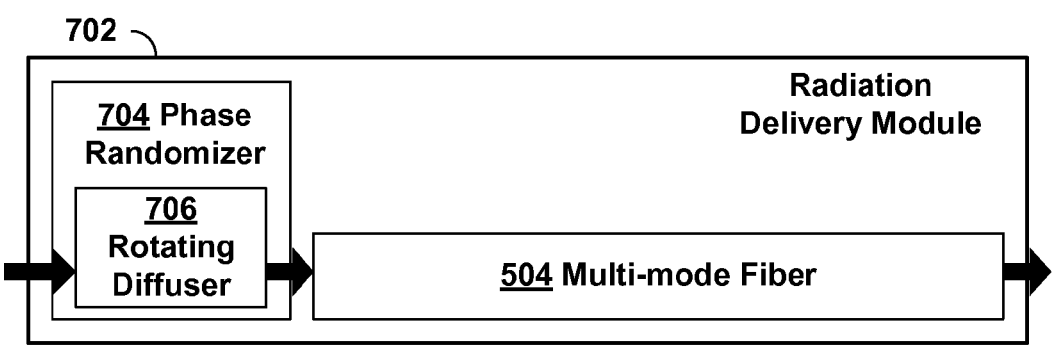

FIG. 7 shows an example radiation delivery module 702 with a phase randomizer 704 comprising a rotating diffuser 706 in proximity to the tip of the input connector at the incident end of the multi-mode fiber 504.

In an alternative implementation (not shown) of a radiation delivery module, the rotating diffuser 706 of the phase randomizer 704 may be placed in proximity to a tip of the output connector at the distal end of the multi-mode fiber 504.

Figure 8:
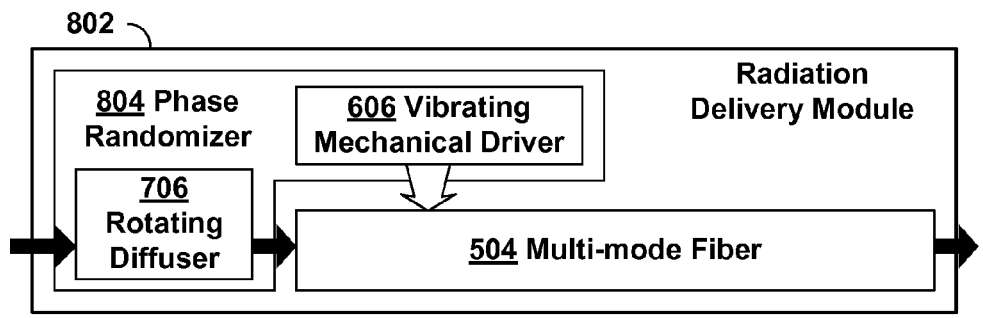

FIG. 8 shows an example radiation delivery module 802 comprising the multi-mode fiber 504 and a phase randomizer 804, the phase randomizer 804 comprising both the vibrating mechanical driver 606 and the rotating diffuser 706. As above, the vibrating mechanical driver 606 is designed to randomize the phase of coherent radiation by inducing vibrations in a section of the multi-mode fiber 504. The rotating diffuser 706, placed in proximity to the tip of the input connector of the multi-mode fiber 504, is also designed to randomize the phase of coherent radiation.

In an alternative implementation (not shown) of a radiation delivery module, the rotating diffuser 706 of the phase randomizer 804 may be placed in proximity to the tip of the output connector at the distal end of the multi-mode fiber 504.

Figure 9:
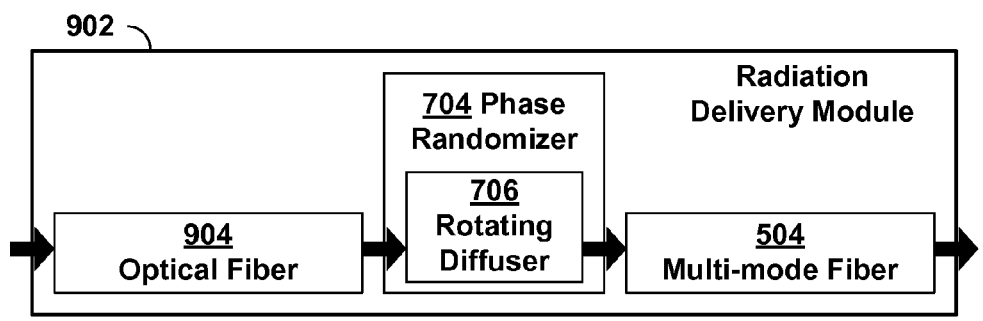
Figure 10:
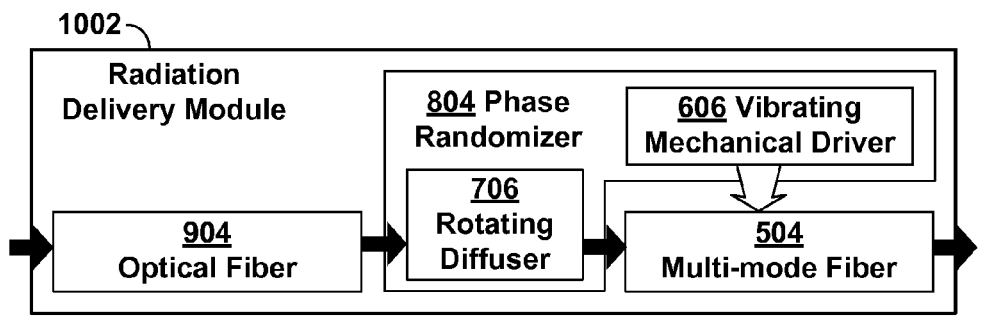

In FIGS. 9 and 10, the example radiation delivery modules comprise an optical fiber 904 and the multi-mode fiber 504. The optical fiber 904 may be a multi-mode fiber or a single mode fiber. An input connector (not shown) is connected or connectable to an incident end of the optical fiber 904 and an output connector (not shown) is connected or connectable to a distal end of the optical fiber 904. An input connector (not shown) is connected or connectable to an incident end of the multi-mode fiber 504 and an output connector (not shown) is connected or connectable to a distal end of the multi-mode fiber 504. The input and output connectors may be of any type, for example, FC type connectors, or any other suitable connectors as would be apparent to someone skilled in the art.

FIG. 9 shows an example radiation delivery module 902 in which light emitted from the optical fiber 904 is transmitted to the multi-mode fiber 504 via the rotating diffuser 706 comprised in the phase randomizer 704. As above, the phase randomizer 704 is designed to randomize the phase of coherent radiation as the radiation is transmitted from the optical fiber 904 to the multi-mode fiber 504.

FIG. 10 shows an example radiation delivery module 1002, in which light emitted from the optical fiber 904 is transmitted to the multi-mode fiber 504 via the rotating diffuser 706 comprised in the phase randomizer 804. As above, the phase randomizer 804 also comprises the vibrating mechanical driver 606, which in this case is designed to induce vibrations in a section of the multi-mode fiber 504. Both the rotating diffuser 706 and the vibrating mechanical driver 606 may be used to randomize the phase of the light delivered to a multi-focal confocal microscope by the radiation delivery module 1002.

In an alternative implementation (not shown) of a radiation delivery module, the vibrating mechanical driver 606 as illustrated in FIG. 10 may be positioned to induce vibrations in a section of the optical fiber 904.

Figure 11:
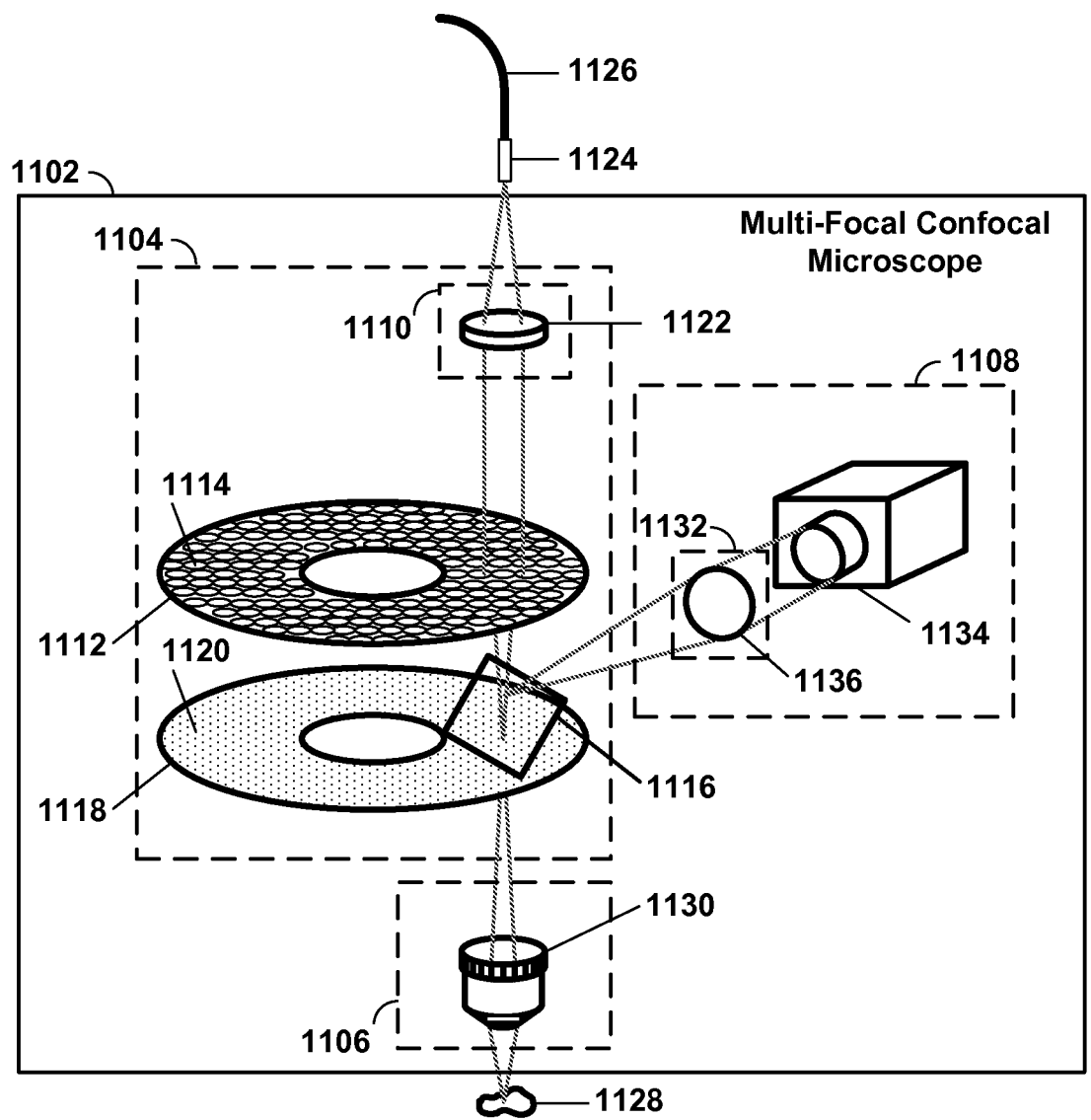
FIG. 11 is a schematic showing an example multi-focal confocal microscope, which can be used in the example microscopy system illustrated in FIG. 3.

FIG. 11 shows a schematic diagram of an example multi-focal confocal microscope 1102 comprising a multi-focal confocal subsystem 1104, a microscope 1106, and a light detecting and imaging unit 1108. The multi-focal confocal microscope 1102 is an example of the multi-focal confocal microscope 306, the microscope 1106 is an example of the microscope 310, and the light detecting and imaging unit 1108 is an example of the light detecting and imaging unit 312.

The multi-focal confocal subsystem 1104 comprises light coupling optics 1110; a microlens array disk 1112 comprising a plurality of individual microlenses 1114; light splitting optics 1116; and a pinhole disk 1118 comprising a plurality of pinholes 1120.

The light coupling optics 1110 are shown here to comprise a collimator lens 1122, but may also comprise various other optical elements. A non-exhaustive list of examples of alternative or additional elements comprised in the light coupling optics 1110 includes a single lens, multiple lenses, mirrors, multiple mirrors or any combination of suitable optical elements, as would be apparent to someone skilled in the art. The collimator lens 1122 may be positioned such that a distance travelled by the light from an output connector 1124 of a multi-mode fiber 1126 to the collimator lens 1122 is substantially equal to a focal length of the collimator lens 1122, and rays incident thereon may be converted into a collimated beam, illuminating a microlens array disk 1112 of the multi-focal confocal subsystem 1104.

The pinhole disk 1118 is mounted on a same axis of the microlens array disk 1112 at a distance substantially equal to a focal length of the microlenses 1114 in such a way that each microlens 1114 focuses its light onto a different individual pinhole 1120 comprised in the pinhole disk 1118. The pinhole disk 1118 is co-rotated with the microlens array disk 1112 at a constant speed.

Alternative implementations of the multi-focal confocal subsystem 1104 may use in place of microlenses 1114 any other suitable type of focusing elements as would be apparent to someone skilled in the art. For example, reflective focusing elements or diffractive focusing elements may be used.

Alternative implementations of the multi-focal confocal subsystem 1104 may use in place of the microlens array disk 1112 and pinhole disks 1118 any geometry comprising a plurality of focusing elements and a plurality of apertures (pinholes, slits, and the like) which is suitable for a multi-focal confocal application, as would be apparent to someone skilled in the art. Hereinafter and in the claims, the term "pinhole" is defined as any illumination aperture suitable for use in a multi-focal confocal microscope.

The light splitting optics 1116 are positioned between the microlens array disk 1112 and the pinhole disk 1118 and are designed to pass exciting radiation to a sample 1128 via the pinhole disk 1118 and the microscope 1106, and to reflect return light from the sample 1128 to the light detecting and imaging unit 1108. The return light is often produced by fluorescence but can result from reflection, Raman scattering or any other elastic or inelastic light scattering effect as would be known to someone skilled in the art.

A non-exhaustive list of examples of light splitting optics 1116 includes a dichroic mirror, a splitter based on polarization, a mirror with a partially reflective surface, or any other device to divide the excitation light from the return light as would be apparent to someone skilled in the art.

The microscope 1106 comprises an objective lens 1130 focusing light from the pinhole disk 1118 onto the sample 1128. Any suitable objective lens may be used as would be apparent to someone skilled in the art. The microscope 1106 may also comprise additional elements, as would be apparent to someone skilled in the art.

The light detecting and imaging unit 1108 comprises light detecting optics 1132 and a high-sensitivity imaging camera 1134. The light detecting optics 1132 may comprise a relay lens 1136, and may comprise additional elements (not shown), such as a blocking filter and/or narrow band filters for multi-spectral imaging. A non-exhaustive list of examples of a high-sensitivity imaging camera 1134 includes a charge-coupled device (CCD) camera, a complementary metal-oxide semiconductor (CMOS) camera, an intensified CCD (ICCD) camera, and any other suitable camera as would be apparent to someone skilled in the art. A 3CCD camera with additional narrowband filters may be applied for simultaneous multi-spectral imaging.

The pinhole disk 1118, the sample 1128, and the high-sensitivity camera 1134 may be arranged such that a plane of the pinhole disk 1118, a plane to be observed in the sample 1128, and an image sensor plane of the high-sensitivity imaging camera 1134 are conjugate with each other optically in order to provide a confocal image of the sample 1128.

Figure 12:
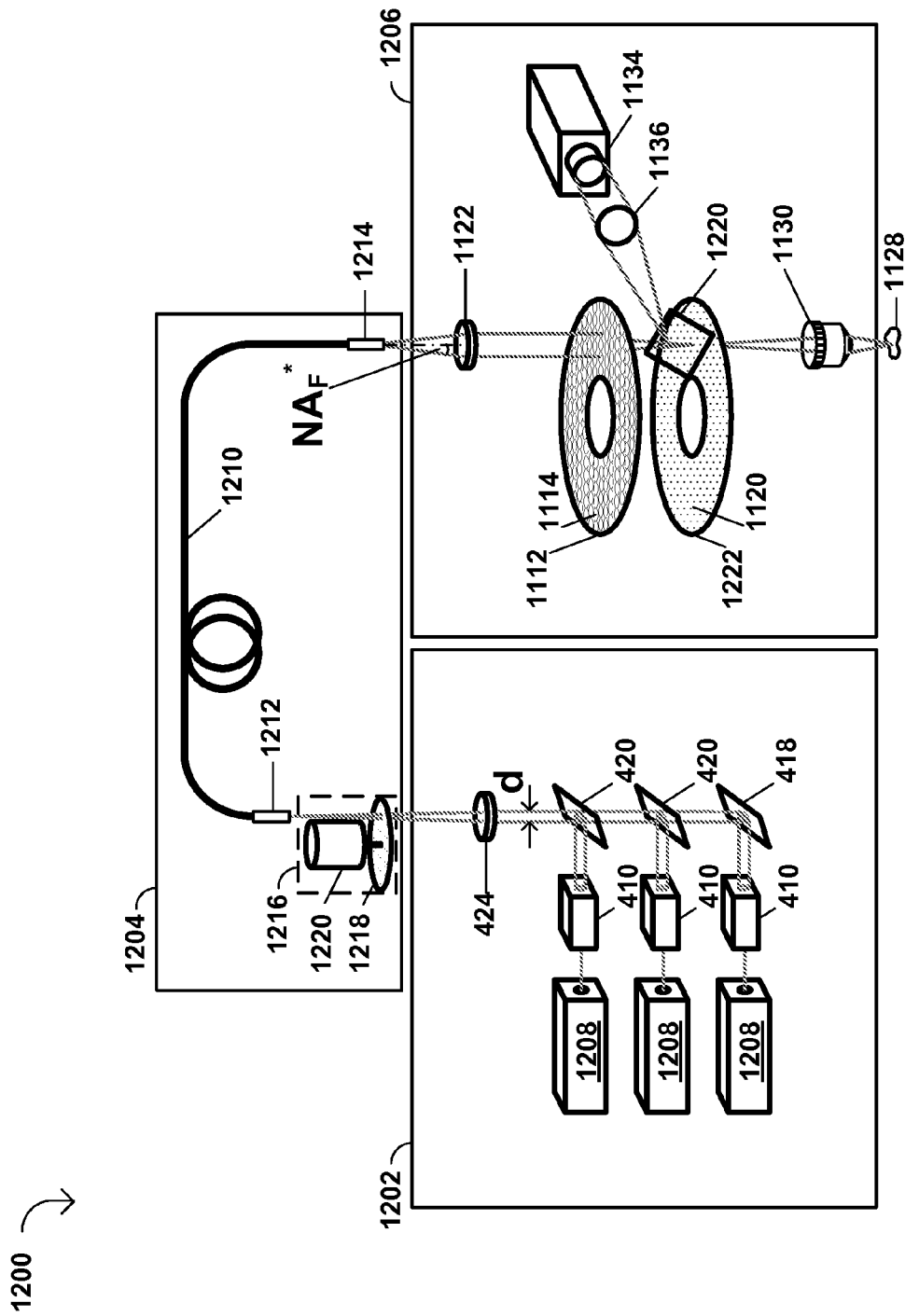
FIGS. 12-14 are schematics showing different example microscopy systems.

FIG. 12 illustrates one example of a multi-focal confocal microscopy system 1200 comprising a radiation source module 1202, a radiation delivery module 1204, and a multi-focal confocal microscope 1206. The radiation source module 1202 is an example of the radiation source module 302. The radiation delivery module 1204 is an example of the radiation delivery module 304. The multi-focal confocal microscope 1206 is an example of the multi-focal confocal microscope 306.

The radiation source module 1202 comprises a plurality of lasers 1208; the light control and conditioning subunits 410, each one corresponding to an individual laser 1208; the folding mirror 418 and two dichroic mirrors 420; and the condenser lens 424.

The radiation delivery module 1204 is an example of the radiation delivery module 702 illustrated in FIG. 7. The radiation delivery module 1204 comprises a multi-mode fiber 1210 with an input connector 1212 at an incident end of the multi-mode fiber 1210 and an output connector 1214 at a distal end of the multi-mode fiber 1210; and a rotating diffuser 1216, the rotating diffuser 1216 comprising a diffuser 1218 fixed on a shaft of a high-speed electromotor 1220. The rotating diffuser 1216 is placed in proximity to the tip of the input connector 1212 of the multi-mode fiber 1210.

The multi-focal confocal microscope 1206 comprises the collimator lens 1122, the microlens array disk 1112, a dichroic mirror 1220, a Nipkow disk 1222, the objective lens 1130, the relay lens 1136, and the high-sensitivity imaging camera 1134.

In operation:

The laser sources 1208 generate laser radiation of different wavelengths in the UV-visible-NIR spectral range. Optics of the light control and conditioning subunits 410 provide the radiation beam being guided into the input connector 1212 of the multi-mode fiber 1210 by the condenser lens 424 with a preferably circular cross section of a predetermined diameter d. In the case that the lasers 1208 generate light beams of a circular cross-section, the light control and conditioning subunits 410 may expand the light from each laser 1208, providing it with a diameter d. In the case that the lasers 1208 generate light beams of an elliptical cross-section, the light control and conditioning subunits may 410 may compensate the beam ellipticity and optimize beam diameter.

The folding mirror 418 and the dichroic mirrors 420 couple the laser beams of the predetermined diameter d, providing a single multicolor collimated beam of exciting radiation incident on the condenser lens 424.

The condenser lens 424 focuses the exciting radiation emitted by the lasers 1208 onto the input connector 1212 of the multi-mode fiber 1210, via passage through the diffuser 1218, which is rotated by the high-speed electromotor 1220. Placed in proximity to the tip of the input connector 1212 of the multi-mode fiber 1210, the rotating diffuser 1216 randomizes the phase of the coherent light from the radiation source module 1202 prior to the delivery of the light to the multi-mode fiber 1210.

Following phase randomization, the light is guided from the input connector 1212 through the multi-mode fiber 1210 to the output connector 1214.

The light emitted from the output connector 1214 of the multi-mode fiber 1210 is turned into diverging rays with a maximum spread-angle dependent on the numerical aperture $NA_F^*$ of the multi-mode fiber 1210, thereby falling on the collimator lens 1122. The collimator lens 1122 is such that a distance travelled by the light from the output connector 1214 of the multi-mode fiber 1210 to the collimator lens 1122 is substantially equal to a focal length of the collimator lens 1122, and rays incident thereon are converted into a collimated beam of light.

The collimated beam of light derived from the exciting radiation falls on the microlens array disk 1112 to be thereby converted into multiple converging beams by respective individual microlenses 1114 disposed on the microlens array disk 1112, and after being transmitted through the dichroic mirror 1220, passes through corresponding individual pinholes 1120 of the Nipkow disk 1222. Then the exciting light beam is converged to the sample 1128 by the objective lens 1130.

In the case that the light beam incident on the sample 1128 causes the sample 1128 to emit a signal comprising any combination of reflected, scattered and fluoresced light, this signal passes through the objective lens 1130 again, and is converged to the individual pinholes 1120 of the Nipkow disk 1222. The signal passing through the individual pinholes 1120 is reflected by the dichroic mirror 1220, so as to be imaged on an image sensor of the high-sensitivity imaging camera 1134 via the relay lens 1136.

The Nipkow disk 1222 is rotated jointly with the microlens array disk 1112 at a constant speed, and a converged light point on the sample 1128 is scanned with the pinholes 1120 of the Nipkow disk 1222 moved by the rotation. A plane of the Nipkow disk 1222, a plane to be observed for the sample 1128, and a light receiving face of the image sensor of the high-sensitivity imaging camera 1134 are arranged to be conjugate with each other optically. Therefore, an optical sectional image, that is, a confocal image of the sample 1128 is imaged on the image sensor of the high-sensitivity imaging camera 1134.

Figure 13:
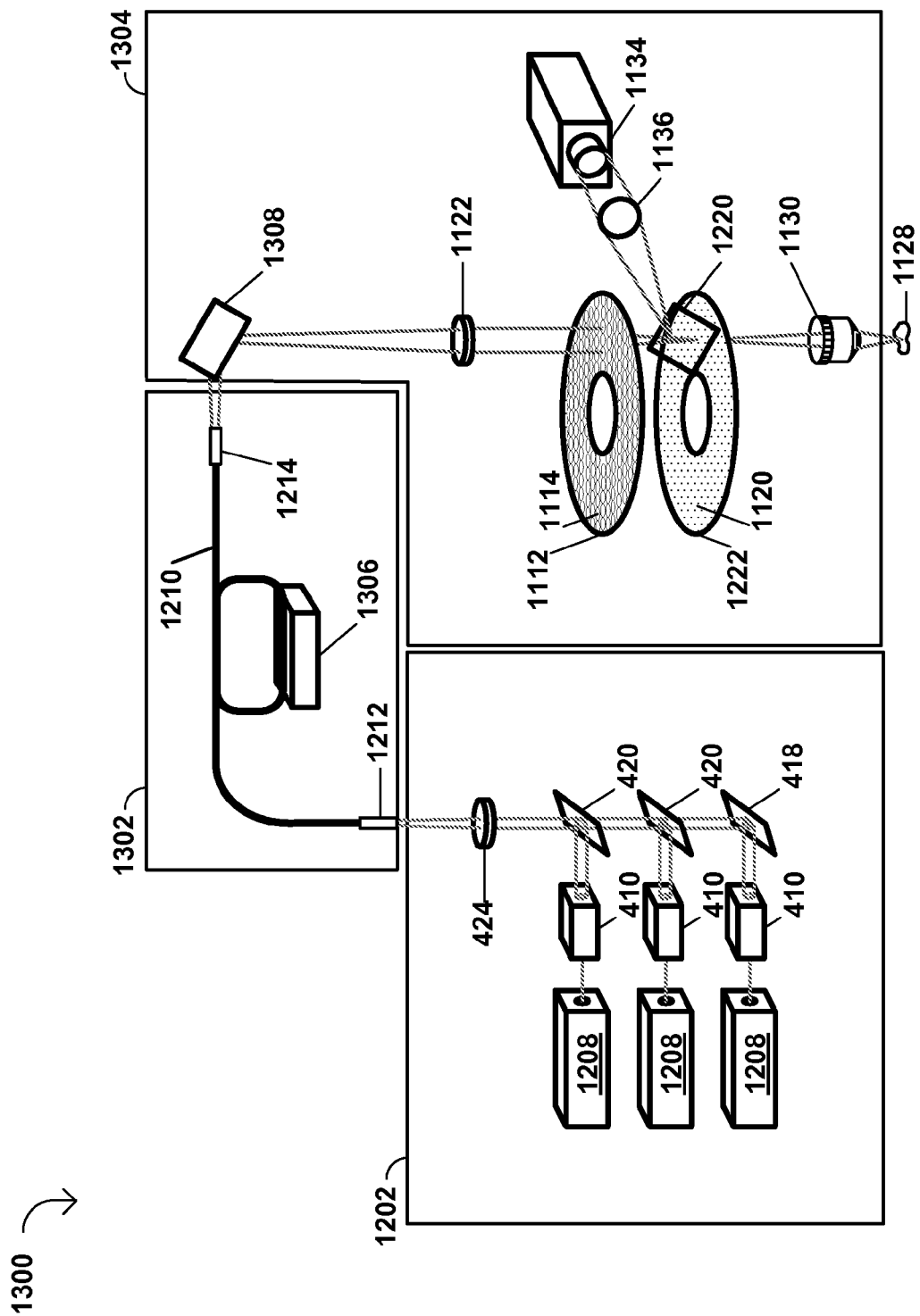

FIG. 13 illustrates another example of a multi-focal confocal microscopy system 1300 comprising the radiation source module 1202, a radiation delivery module 1302, and a multi-focal confocal microscope 1304. The multi-focal confocal microscope 1304 is an example of the multi-focal confocal microscope 306.

The radiation delivery module 1302 is an example of the radiation delivery module 602 illustrated in FIG. 6. The radiation delivery module 1302 comprises the multi-mode fiber 1210 with the input connector 1212 and the output connector 1214; and a vibrating mechanical driver 1306. The vibrating mechanical driver 1306 is example of the vibrating mechanical driver 606 and is designed to generate vibrations in a section of the multi-mode fiber 1210, thereby randomizing the phase of the light from the radiation source module 1202 prior to its delivery to the multi-focal confocal microscope 1304. In one implementation, the vibrating mechanical driver 1306 may be attached to a portion of the multi-mode fiber 1210 that is coiled and loosely held by retaining clamps (not shown), allowing a long length of the multi-mode fiber 1210 to be vibrated.

The multi-focal confocal microscope 1304 comprises a folder mirror 1308, the collimator lens 1122, the microlens array disk 1112, the dichroic mirror 1220, the Nipkow disk 1222, the objective lens 1130, the relay lens 1136, and the high-sensitivity imaging camera 1134. The folding mirror reflects light emitted by the output connector 1214 of the multi-mode fiber 1210 onto the collimator lens 1122.

In operation:

As in system 1200 above, the radiation source module 1202 produces laser light for acceptance into the radiation delivery module 1302. In this case, the condenser lens 424 focuses the exciting radiation emitted from the lasers 1208 onto the input connector 1212 of the multi-mode fiber 1210. As the light is being guided along the multi-mode fiber 1210, the vibrating mechanical driver 1306 generates vibrations in a section of the multi-mode fiber 1210, resulting in fast variations of the optical path lengths of individual rays in the multi-mode fiber 1210. The vibrations randomize the coherence effects of the light, thereby suppressing spatial modulation of the amplitude of image of the sample (speckle).

The light emitted from the output connector 1214 of the multi-mode fiber 1210 is reflected by the folding mirror 1308 so as to fall on the collimator lens 1122. The collimator lens 1122 of the multi-focal confocal microscope 1304 is positioned such that a distance travelled by the light from the output connector 1214 of the multi-mode fiber 1210 to the collimator lens 1122 is substantially equal to a focal length of the collimator lens 1122. The rays incident on the collimator lens 1122 are converted into a collimated beam of light. The rest of the elements in the multi-focal confocal microscope 1304 operate as described with respect to system 1200 of FIG. 12.

Figure 14:
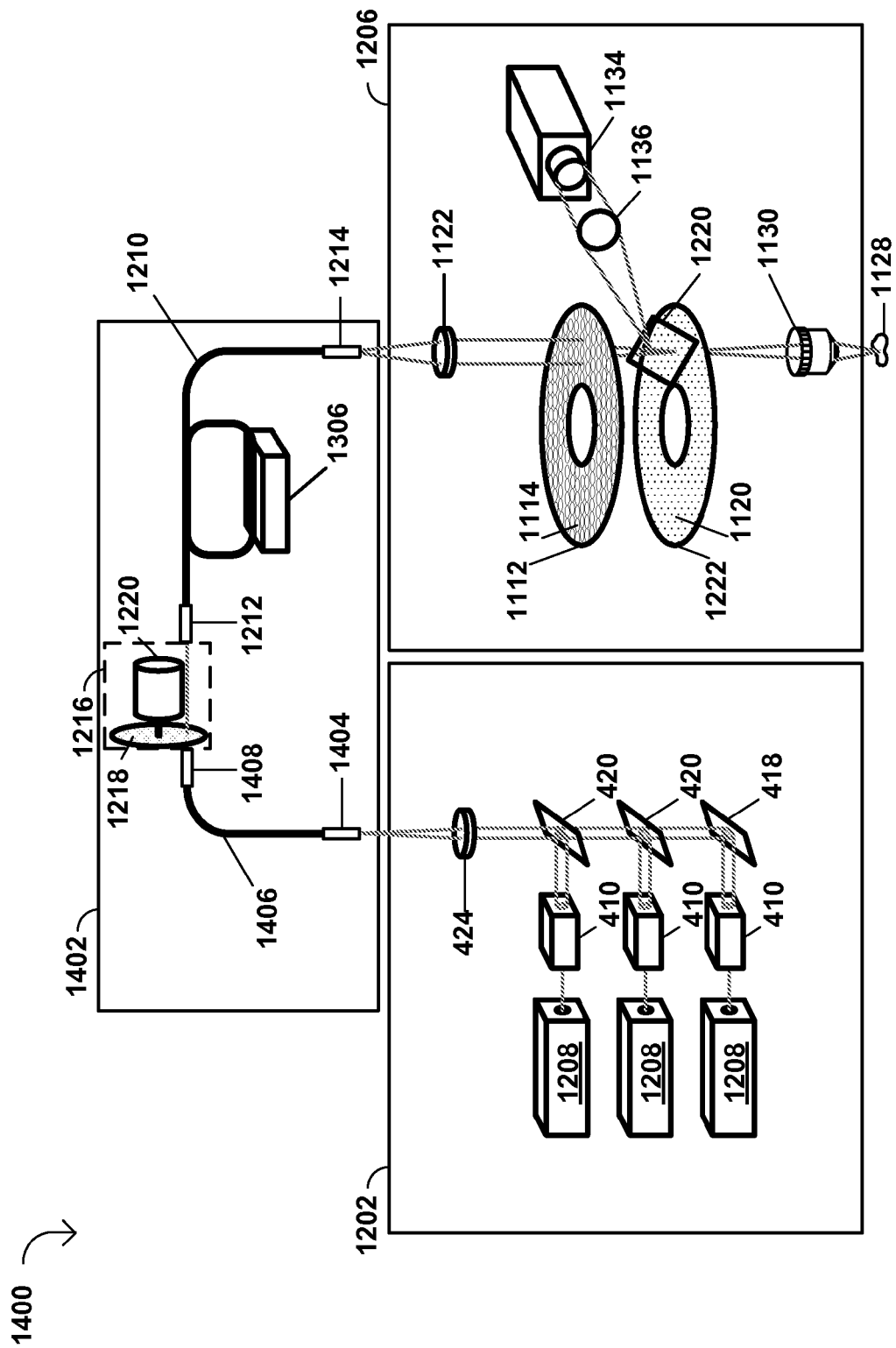

FIG. 14 illustrates another example of a multi-focal confocal microscopy system 1400 comprising the radiation source module 1202, a radiation delivery module 1402, and the multi-focal confocal microscope 1206.

The radiation delivery module 1402 is an example of the radiation delivery module 1002 illustrated in FIG. 10. The radiation delivery module 1402 comprises an optical fiber 1406 with an input connector 1404 and an output connector 1408; the rotating diffuser 1216 comprising the diffuser 1218 rotated by the high-speed electromotor 1220; the multi-mode fiber 1210 with the input connector 1212 and the output connector 1214; and the vibrating mechanical driver 1306. The optical fiber 1406 may be a multi-mode fiber or a single mode fiber.

In operation:

As in system 1200 above, the radiation source module 1202 produces laser light for acceptance into the radiation delivery module 1402. In this case, the condenser lens 424 focuses the exciting radiation emitted from the lasers 1208 onto the input connector 1404 of the optical fiber 1406. After being guided through the optical fiber 1406, the light is emitted from the output connector 1408 and is accepted into the input connector 1212 of the multi-mode fiber 1210, via passage through the diffuser 1218, which is rotated by the high-speed electromotor 1220. Placed in proximity to the tip of the input connector 1212 of the multi-mode fiber 1210, the rotating diffuser 1216 randomizes the phase of the light emitted from the optical fiber 1406 prior to the delivery of light to the multi-mode fiber 1210. As the light is being guided through the multi-mode fiber 1210, the vibrating mechanical driver 1306 generates vibrations in a section of the multi-mode fiber 1210, resulting in fast variations of the optical path lengths of individual rays in the multi-mode fiber 1210. The vibrations further randomize the phase of light as it is guided through the multi-mode fiber 1210.

After being guided through the multi-mode fiber 1210, the light is emitted from the output connector 1214 onto the multi-focal confocal microscope 1206, which operates as described above with respect to FIG. 12.

Multi-focal confocal microscopy systems, such as 1200, 1300, and 1400, may be designed in consideration of the following parameters:

core diameter $D_F^*$ of the multi-mode fiber 1210;

divergence $NA_F^*$ of the beam emitted from the multi-mode fiber 1210;

focal length $F_3$ of the collimator lens 1122;

focal length $F_4$ of the microlenses 1114;

diameter d of the collimated beam; and diameter $D_P$ of the pinholes 1120 in the Nipkow disk 1222.

To provide the maximal resolution and the brightest illumination of the sample 1128 using the multi-focal confocal microscope 1206 (1304) with the objective lens 1130 of magnification M, the parameters may be selected such that:

a distance travelled by the light from the output connector 1214 of the multi-mode fiber 1210 to the collimator lens 1122 is substantially equal to $F_3$;

a distance travelled by the light from the microlens array disk 1112 to the Nipkow disk 1222 is substantially equal to $F_4$;

the diameter of the focal points from the individual microlenses 1114 of the microlens array disk 1112 are comparable to or less than the diameter $D_P$ of the pinholes 1120 of the Nipkow disk 1222; and the core diameter $D_F^*$ of the multi-mode fiber 1210 is substantially equal to or smaller than the product of $D_P$ and the ratio of the focal lengths $F_3$ to $F_4$.

An example calculation for a multi-focal confocal microscopy system with a radiation delivery module comprising a multi-mode fiber will now be presented. Consider the multi-mode fiber having a core diameter $D_F^*$=200 microns; a microlens array disk comprising a plurality of individual microlenses, each having a focal length $F_4$=15 mm; and a collimator lens having a focal length $F_3$=60 mm. From the ratio of focal lengths, the diameter of a focal point from an individual microlens of the microlens array disk is 200 microns×(15 mm/60 microns)=50 microns, which will match the diameter $D_P$=50 microns of a plurality of pinholes comprised in a pinhole disk. That is, the diameter of the projected focal point from each microlens matches the diameter of the corresponding pinhole.

It should be noted that specific examples of multi-focal confocal microscopy systems have been particularly shown and described heretofore only for the purpose of explaining and illustrating the technology disclosed herein. It will therefore be apparent to those skilled in the art that various changes, modifications or alterations may be made.

For example, the technology has been described by taking as an example the case where the core diameter of the multi-mode fiber is 200 microns. The inventor has contemplated other core diameters of the multi-mode fiber. For example, if the specific optical geometry of a multi-focal confocal system is similar or identical to the specific optical geometry on which the calculations leading to equation 3 are based, then a smaller or larger core diameter for the multi-mode fiber which is technically reasonable may be used if the limiting condition of equation 3 is approximately satisfied. Even for the case of a microlens array disk comprising a plurality of individual microlenses, each having a focal length $F_4=15$ mm; and a collimator lens having a focal length $F_3=60$ mm, and a pinhole disk comprising a plurality of pinholes of diameter $D_P=50$ microns, a multi-mode fiber of core diameter not substantially exceeding (for example, by a factor of 1.5 or more) 200 microns may still achieve reasonable efficiency.

Regardless of the specific optical geometry of the multi-focal confocal system, the principles of etendue described above are applicable. Reasonable efficiency can be achieved so long as the etendue of light emitted from the multi-mode fiber and incident on the multi-focal confocal subsystem does not substantially exceed (for example, by a factor of 1.5 or more) the etendue of light that actually passes through the plurality of pinholes. As explained above, given that there are various inefficiencies in an optical design, in practice $\Omega_F^* < \Omega_F$, where $\Omega_F$ is the etendue of light emitted from the multi-mode fiber and $\Omega_F^*$ is the etendue of light that actually passes through the plurality of pinholes. If the core diameter of the multi-mode fiber is too large, then $\Omega_F$ will be too large to achieve reasonable efficiency. The core diameter of a multi-mode fiber may be determined from the desired etendue of light emitted from the multi-mode fiber and the solid angle subtended by light emitted from the multi-mode fiber. The inventor contemplates that in general, a suitable core diameter of a multi-mode fiber used to guide light emitted from a radiation source module to a multi-focal confocal microscope is less than 800 microns, for example, not substantially exceeding 300 microns.

Examples have been taken wherein three laser radiation sources are provided and three light control and conditioning units are provided accordingly. Alternatively, it is possible to include one or more radiation sources and provide as many different wavelengths of the exciting radiation. It is also possible to improve the signal-to-noise ratio of images if a radiation source with only one of the wavelengths is selected and put into use by the switching means and return light from a sample is received in a time division manner.

While certain features of the technology have been illustrated and described herein, many modifications, substitutions, changes, and equivalents will now occur to those of ordinary skill in the art. It is, therefore, to be understood that the appended claims are intended to cover all such modifications and changes.

What is claimed is:

1. A method comprising:
   guiding light emitted from a radiation source module that comprises one or more lasers through a multi-mode fiber to a multi-focal confocal microscope comprising multiple focusing elements that focus light exiting the multi-mode fiber onto corresponding illumination apertures; and
   randomizing phase of the light,
   wherein a core diameter of the multi-mode fiber is no more than 800 microns.

2. The method as claimed in claim 1, wherein the core diameter does not substantially exceed 300 microns.

3. The method as claimed in claim 1, wherein randomizing phase of the light comprises randomizing phase of the light prior to guiding the light through the multi-mode fiber.

4. The method as claimed in claim 1, wherein randomizing phase of the light comprises randomizing phase of the light while guiding the light through the multi-mode fiber.

5. The method as claimed in claim 1, wherein randomizing phase of the light comprises randomizing phase of the light emitted from the multi-mode fiber prior to incidence of the light on the multi-focal confocal microscope.

6. A method comprising:
   guiding light emitted from a radiation source module that comprises one or more lasers through a multi-mode fiber to a multi-focal confocal microscope comprising multiple focusing elements that focus light exiting the multi-mode fiber onto corresponding illumination apertures; and
   randomizing phase of the light.

7. The method as claimed in claim 6, wherein randomizing phase of the light comprises randomizing phase of the light prior to guiding the light through the multi-mode fiber.

8. The method as claimed in claim 6, wherein randomizing phase of the light comprises randomizing phase of the light while guiding the light through the multi-mode fiber.

9. The method as claimed in claim 6, wherein randomizing phase of the light comprises randomizing phase of the light emitted from the multi-mode fiber prior to incidence of the light on the multi-focal confocal microscope.

* * * * *